(12) United States Patent
Hoerster et al.

(10) Patent No.: US 10,599,153 B2
(45) Date of Patent: Mar. 24, 2020

(54) METHOD OF AUTONOMOUS OPERATION OF A COMPRESSION APPARATUS

(71) Applicant: AMMANN SCHWEIZ AG, Langenthal (CH)

(72) Inventors: Jochen Hoerster, Bergisch Gladbach (DE); Armin Malaschewski, Ehlscheid (DE); Mirko Pinkert, Eitorf (DE)

(73) Assignee: AMMANN SCHWEIZ AG, Langenthal (CH)

( * ) Notice: Subject to any disclaimer, the term of this patent is extended or adjusted under 35 U.S.C. 154(b) by 0 days.

(21) Appl. No.: 15/990,649

(22) Filed: May 27, 2018

(65) Prior Publication Data

US 2018/0348773 A1 Dec. 6, 2018

Related U.S. Application Data

(63) Continuation of application No. PCT/EP2016/079908, filed on Dec. 6, 2016.

(30) Foreign Application Priority Data

Dec. 17, 2015 (DE) .................. 10 2015 122 149

(51) Int. Cl.
  *G05D 1/02* (2020.01)
  *E01C 19/00* (2006.01)
  *E01C 19/26* (2006.01)

(52) U.S. Cl.
  CPC ......... *G05D 1/0219* (2013.01); *E01C 19/006* (2013.01); *E01C 19/266* (2013.01);
  (Continued)

(58) Field of Classification Search
  CPC .. G05D 1/0219; G05D 1/0278; G05D 1/0221; G05D 2201/0202; E01C 19/006; E01C 19/266
  See application file for complete search history.

(56) References Cited

U.S. PATENT DOCUMENTS 4,600,999 A * 7/1986 Ito .................. A01B 69/008
  318/587
6,112,143 A * 8/2000 Allen ................ E01C 19/006
  342/357.32

(Continued)

FOREIGN PATENT DOCUMENTS

DE          19983437 T1    8/2001
DE      102012208554 A1   11/2013

*Primary Examiner* — Thomas Ingram
(74) *Attorney, Agent, or Firm* — Von Rohrscheldt Patents

(57) ABSTRACT

A method for autonomous operation of a compression apparatus for compressing a ground, the method comprising the steps: choosing a surface to be processed of the ground; preparing the compression apparatus or at least a portion of the surface to be processed so that the compression apparatus automatically processes the surface to be processed in an autonomous operation so that substantially each spot of the surface to be processed is processed at least once; moving a position-determination device along a path which represents at least a portion of an outer boundary of the surface to be processed and capturing position data by the position determination device at least in an intermittent manner while moving the position determination device along the path; generating electronic information regarding a position of the outer boundary of the surface to be processed based on captured position data of the path.

1 Claim, 2 Drawing Sheets

(52) U.S. Cl.
CPC ......... *G05D 1/0221* (2013.01); *G05D 1/0278* (2013.01); *G05D 2201/0202* (2013.01)

(56) References Cited

U.S. PATENT DOCUMENTS

| | | | |
|---|---|---|---|
| 2004/0068352 A1* | 4/2004 | Anderson | A01B 69/008 701/25 |
| 2014/0102062 A1* | 4/2014 | Sandin | G05D 1/0225 56/10.2 A |
| 2016/0100522 A1* | 4/2016 | Yamauchi | G05D 1/0236 701/25 |

* cited by examiner

METHOD OF AUTONOMOUS OPERATION OF A COMPRESSION APPARATUS

RELATED APPLICATIONS

This application is a continuation of International Patent Application PCT/EP2016/079908 filed on Dec. 6, 2016 claiming priority from German Patent Application DE 10 2015 122 149.7 filed on Dec. 17, 2015, both of which are incorporated in their entirety by this reference.

FIELD OF THE INVENTION

The present invention relates to a method for autonomous operation of a compression apparatus for compressing a ground.

A compression apparatus according to the invention is any type of apparatus that is configured to compress ground. Compressing the ground is important in particular for construction applications, thus it is essential to prevent a subsequent settling of the ground caused by loads placed on the ground. The settling can lead to a subsequent damage of a respective building that is erected on the ground. This is important for road construction as well as for building construction. Compression apparatuses are typically vibrating units that have rather high mass. A combined effect of vibration and weight of the respective compression device provides the compression performance. The compression performance compresses individual particles of the respective ground in order to preempt a subsequent compression of the particles.

Preparing according to the instant invention indicates a type of preparation which either relates to the compression device or the respective ground surface to be processed or both. The preparing can include for example to provide the surface to be processed with delineating elements which designate a boundary of the surface to be processed for the compression apparatus.

The term "autonomous operations" according to the instant invention designates an operating mode of the compression apparatus in which the compression apparatus can operate at least temporarily without an input from a person steering the compression apparatus. In particular the compression apparatus can drive on the surface to be processed self-acting during autonomous operation, so that the ground is compressed on the surface that is to be processed. Operations of a compression device of this type can be interpreted as autonomous operations according to the instant invention wherein the operations require periodic checking by a responsible person wherein the checking may be required in particular based on legal regulations. In spite of this checking the compression apparatus can process the respective surface without a permanent active input from a machine operator.

A "spot" of the surface to be processed is a partial surface of the surface to be processed but not a location in a mathematical sense. Thus, it is conceivable for example that a processed surface is considered finished, this means all spots of the processed surface are deemed covered though individual points with a negligible size, for example in a range of a few square centimeters were not covered by the compression apparatus. A non-processed surface therefore exists only when a non-negligible surface portion of the surface to be processed has not been covered by the compression device once though the run has been completed. The question whether a respective spot is negligible or not depends in particular from an individual building situation or a respective purpose of the surface to be processed. For example in building construction a non-processed partial surface of a few square meters is not negligible. In this case the surface is considered as not completely processed and consequently not every spot of the surface to be processed is not considered as "covered at least once" according to the instant invention.

"Position data" according to the invention can be absolute position data or also relative position data. Absolute position data is unique global data, for example in a form of degrees of longitude, degrees of latitude and elevation. On the other hand side relative position data refer to a local reference point, e.g. a point proximal to the surface to be processed. The captured position data can be cartesic data or radial data. For capturing an outer boundary of the surface to be processed both types of position data can be helpful wherein absolute position data is advantageously used since this does not require an additional relative reference.

While generating electronic information that describes a position of an outer boundary of the surface to be processed it is not essential whether the generation of the electronic information is performed simultaneously with capturing the position data or thereafter. The electronic information can be provided for example in a form of an electronic file that is provided in a suitable format that is comprehensible for a particular software application.

With respect to the compression apparatus remaining on the surface to be processed it is as a matter of principle irrelevant for a success of the method according to the invention when the compression apparatus does not perform an immediate direction change upon a collision with an outer boundary but runs over the outer boundary at least by a certain amount. This can be the case for example when the compression apparatus runs over the outer boundary of the surface to be processed by accident during a change of the driving direction.

Thus, it is appreciated that the compression apparatus can be for example a typical rattling plate whose propulsion is only provided based on asymmetrically oscillating masses. This has the effect that steering a rattling plate of this type is not possible in a manner that is as precise as e.g. for an apparatus that runs on wheels. An imprecision in a motion of a compression apparatus of this type can cause a passing of an outer boundary of the surface to be processed which though undesirable is manageable. A passage of this type is not detrimental for the method according to the invention. In particular, care should be taken that the passage of the compression apparatus over the outer boundary occurs at the most by an amount that corresponds to the longest dimension of the compression apparatus itself. Put differently, for a rattling plate whose longest dimension of its plate is 1.5 meters the outer boundary should not be exceeded by more than 1.5 meters. In the instant application the compression apparatus is considered to essentially remain on the surface to be processed when a maximum permissible passage of the boundary has occurred.

A "position determination" device according to the instant application is any type of device that is configured to determine a relative or absolute position. A position determination device of this type can be for example a GPS module. Additionally, a position determination device can include position sensors, an electric compass, optical sensors, ultrasound sensors or similar. In particular, the recited sensor types are configured to determine a relative position of the compression apparatus wherein the relative position is determined with respect to a ground with reference to fixed points or similar.

Typically, the position determination device captures a closed curve which then represents an outer boundary of the surface to be processed. The outer boundary in this case is entirely formed by a path which is captured by the position determining device. It is also conceivable that at least a portion of an outer boundary of the surface to be processed is already occupied by an adjacent building. This section of the surface to be processed, thus, does not have to be a portion of the path that is captured by the position determining device. In particular, the compression apparatus operating autonomously is enabled to respect an external building limitation or a portion thereof in that the compression apparatus contacts the building defined portion of the outer boundary or detects a respective obstacle with corresponding sensors. Electronic information regarding a position of the outer boundary is not mandatory in this type of section or portion of the outer boundary. Accordingly, it can suffice depending on an installation situation to only detect a portion of the outer boundary with the position determination device.

An "intermittent capture" of position data can be performed e.g. in that the position data is captured in predetermined discrete time intervals, for example, once per second. It is also conceivable that a point in time of detection when a current position of the position determination device is captured is determined manually, e.g. by actuating a corresponding trigger switch.

Generating "electronic information" based on the captured position data can be performed in that individual position data which is provided in a form of data points is transposed into a virtual path by connecting the individual data points which then describes the outer boundary of the surface to be processed. It is conceivable, for example, that a polygonal path is generated from a number of captured fixed points along the respective path which then corresponds to an outer boundary of the surface to be processed. By the same token, it is conceivable that the captured position data is manually manipulated which generates the electronic information.

"Supplying" the compression device with the electronic information includes the electronic supply as well as a mechanical supply. Thus, it is conceivable, for example, to transfer the electronic information to a data storage of the compression device so that the compression apparatus is enabled by an integrated data processing system to process the electronic information stored on the data storage device and to eventually perform autonomous operations based on the electronic information. By the same token it is also conceivable that the electronic information is provided stored on a data storage device to the compression apparatus. For example, it is conceivable that the electronic information is stored on a USB stick that is connected to the compression apparatus. By the same token, it is conceivable that the electronic information is directly generated by the position determination device and stored therein and the position determination device as such is overall connected to the compression apparatus. This way, the compression apparatus is simultaneously provided with a position determination device and required electronic information regarding a position of an outer boundary of the surface to be processed.

The "collision" of the compression apparatus with the outer boundary describes an event during which the compression apparatus contacts the virtual outer boundary. Consequently, a mechanical collision of the compression apparatus with a solid object does not occur as a matter of consequence.

BACKGROUND OF THE INVENTION

A method of the generic type described supra is already known in the art. Reference is made to the German publication document DE 10 2012 208 554 A1 This document describes a method for planning and performing ground compression, in particular for asphalt compression. The document relates to the issue how a particular section of a roadway can be processed by a compression device in a particularly effective manner. Thus, the document proposes, among other things, to provide the compression device with a GPS module which enables the compression device to capture data regarding its current position.

Based on this position data, the known compression apparatus is furthermore configured to run along a predetermined path autonomously, wherein occasional interference by an operator is required according to the disclosure.

The known method has the disadvantage that the entire path that shall be covered by the compression apparatus has to be captured and predetermined before autonomous operations of the compression apparatus start so that the compression apparatus can follow this path. This method is disadvantageous in particular for large surfaces that often occur in large construction sites and for uneven outer circumferences of boundaries of the respective surface since it can be associated with considerable complexity to completely plan each movement of the compression apparatus before autonomous operations.

Furthermore, DE 199 83 437 T1 discloses a method to define a circumference of an area that is to be processed by a mobile machine. This method includes several method steps, wherein a circumference of the area to be processed is entered manually in a first method step. Thus, a position determination device is initially moved to various characteristic points of a circumferential path of the area to be processed and a position query is respectively performed at the characteristic points. This way the positions of several points are captured which jointly define a circumference of the area to be processed after completing the first method step. After entering the data, a software proposes an advantageous operating mode, this means an operating path for processing the area thus defined. Processing the area is then performed autonomously, wherein, the respective machine is enabled to continuously check its position relative to the area to be processed using the position determination device.

The known method has its disadvantages since capturing the circumferential path of the area to be processed is time consuming and complicated.

BRIEF SUMMARY OF THE INVENTION

The instant invention relates to a method that requires less preparation for autonomous operations of a compression apparatus compared to the prior art.

The object is achieved by a method for autonomous operation of a compression apparatus for compressing a ground, the method including the steps choosing a surface to be processed of the ground; preparing the compression apparatus or at least a portion of the surface to be processed so that the compression apparatus automatically processes the surface to be processed in an autonomous operation so that substantially each spot of the surface to be processed is processed at least once; moving a position-determination device along a path which represents at least a portion of an outer boundary of the surface to be processed and capturing position data by the position determination device at least in an intermittent manner while moving the position determination device along the path; generating electronic information regarding a position of the outer boundary of the surface to be processed based on captured position data of the path; providing the compression apparatus with the electronic information to enable the compression apparatus during autonomous operation to automatically adjust a driving direction of the compression apparatus after colliding with the outer boundary so that the compression apparatus substantially remains within the surface to be processed; a person walking the position determination device along the path.

"Walking along the path" means carrying the position determination device along the path by a person.

The method according to the invention has many advantages in particular the desired path can be captured in a quick and simple manner, wherein, a mobile position determination device can be carried along the path by a person that captures the path. The speed advantage over the prior art comes from the fact that the compression apparatus is not required for the method step of capturing the outer boundary of the surface to be processed. Therefore, the compression apparatus does not have to be unloaded and placed at a point of the outer boundary. On the other hand side, the advantage is that a person can walk along the outer boundary much more quickly than a typical compression apparatus can drive along the outer boundary. This is caused by the typically very low advancing speed of the compression apparatus which is below 1 km/h. A person that carries the position determination device along can typically walk along the path with a speed of 3 km/h to 5 km/h.

In addition to a portable position device it is also conceivable that a drivable or rollable position determination device is moved along the path by a person. Advantageously, the manually driven position determination device is connected to the compression apparatus after capture of the position data is completed. As recited supra, it is required for autonomous operations of the compression device that the compression device includes a position determining device. Suitable position determining devices, in particular complex GPS modules, can be rather expensive. Therefore, a respective position determination device has to be used effectively. In particular it is conceivable to make the position determination device portable and to dock it at the compression apparatus after capturing the position data of the path and to keep using the position determination device during autonomous operations.

According to the invention, a complexity of preparing the surface to be processed is significantly reduced, wherein, it is appreciated that a ratio of preparation complexity to processing time is the more favorable the larger the surface to be processed and the longer the outer boundary of the surface is. It is furthermore particularly advantageously that defining the surface to be processed does not require any significant effort. In particular, the position determination device can be moved spontaneously on site along a random path without requiring any advance planning which defines the outer boundary of the surface to be processed. Programming the compression apparatus can therefore be performed even with very little knowledge of the building arrangement and can be performed by anybody since it does not require any particular skill.

Advantageously, it is being checked during a generation of the electronic information based on the captured position data whether the virtually defined outer boundary of the surface to be processed is closed. This way, it is assured that the compression apparatus cannot "escape" by accident from the surface to be processed. This checking increases operational safety of the compression apparatus during autonomous operations.

Advantageously, the path along which the position determination apparatus is run during capture of the position data is internally closed. This can be useful even when at least a portion of the outer boundary of the surface to be processed is already defined by buildings and a separate capture of position data is not mandatory at least for this portion. Processing the position data and generating the electronic information can be performed in a particularly simple manner when there is a closed path.

Advantageously, a polygonal path is generated from the position data that was captured along the path. A polygonal path of this type is made from a plurality of straight sections that extend between fixed points. The geometry of the path or a boundary resulting there from is therefore rather simple and in any case less complex than an outer boundary which includes curved and cambered path sections. A very simple contour of the outer boundary is particularly advantageous for subsequent autonomous operations of the compression apparatus so that a straight run portion of the compression apparatus is as high as possible.

Advantageously, a position of the compression apparatus during autonomous operations is determined at least temporarily by at least one position determination device and at least one electrical compass. The position determination device is initially used to determine an absolute or relative position of the compression apparatus on the surface to be processed. The electrical compass provides information regarding an orientation of the compression apparatus in addition to position information. This additional information allows a determination in which direction the compression device moves or in which direction the compression device is oriented. Thus, a determination can be made whether a steering movement or a directional change to the left or the right is suitable to adjust a driving direction of the compression apparatus. Using a position determination device without an electrical compass only allows to derive this movement information in view of prior position data which allows determining in which direction the compression apparatus currently moves.

For a particularly efficient processing of the surface to be processed it is furthermore advantageous when the compression apparatus uses a particular movement structure during autonomous operations. This is different from random path-finding that is quite common for autonomous vacuum cleaners or lawn mowers. These routines, however, have the advantage that they are implementable in a particularly simple manner with respect to their movement algorithm. However, they are not suitable for efficient processing of the surface to be processed. In particular, a structured movement algorithm which causes a methodical movement of the autonomous compression apparatus on the surface to be processed allows a comparatively quick and energy saving processing of the surface to be processed. This is of interest in particular in that a compression apparatus typically has a rather high consumption of fuel which causes rather high emissions and which also comes with a high wear of the compression apparatus. Quickly covering all spots of the surface to be processed is of particularly high interest.

A structured movement algorithm is advantageous in particular by which the compression apparatus covers the surface to be processed in an annular manner, in particular from an outside inward. In practical applications, this can be, for example, configured so that autonomous operations of the compression apparatus are activated after transferring the electronic information regarding the outer boundary of the surface to be processed to the compression apparatus, wherein the compression apparatus can be at any location of the surface to be processed at this point in time. In particular, it is conceivable that the compression apparatus is already positioned on the outer boundary or at least directly adjacent thereto. After activating autonomous operations the compression apparatus moves in a straight line depending on its current orientation until the compression apparatus collides for the first time with the outer boundary of the surface to be processed. Thereafter, the movement direction of the compression apparatus is advantageously changed so that the compression apparatus moves along the outer boundary from then on and travels the surface to be processed in an annular or helical path until the compression apparatus has covered each spot of the surface to be processed at least once.

Alternatively, it is also conceivable to position the compression apparatus at a central location of the surface to be processed intentionally so that the compression apparatus processes the surface to be processed in an annular or helical path inside out after autonomous operations are activated. Due to a typically uneven geometry of the surface to be processed, the latter variant is not as advantageous as the variant "outside".

Alternatively, or additionally, it is also conceivable that the compression apparatus processes the surface to be processed during autonomous operations at least temporarily, advantageously all the time in driving strips that are parallel to each other. For a movement algorithm of this type the compression apparatus travels along parallel driving strips sequentially wherein the compression apparatus always reverses when it hits an outer boundary of the surface to be processed. Thus, is it appreciated that the compression apparatus has to perform a lateral movement relative to any additional driving strip in order to process a surface that has not been processed so far. A combined movement algorithm is also conceivable according to which the compression apparatus initially performs a strip by strip processing and subsequently, switches to annular processing on a residual surface section that has an irregular shape. For example, it is conceivable that the processing duration of a respective driving strip is continuously determined between two reversals and when a particular minimum duration is undercut, the movement algorithm automatically switches to annular. Using stripwise processing is of particular interest when the compression apparatus can cover a rather long distance per strip, so that frequent reversals upon reaching an outer boundary of the surface to be processed are not necessary. In particular, times for processing a strip and for subsequent reversal should be in an acceptable ratio relative to each other.

For particularly efficient processing of the ground to be processed it is furthermore advantageous when the compression apparatus is operated during autonomous operations with an overlap of at least 10 cm, advantageously at least 20 cm, further advantageously at least 30 cm. An overlap of this size is particularly useful since determining a position of the compression apparatus is error-prone due to a lack of precision of the position determination device that is respectively used. Providing an overlap dimension consequently prevents that spots of the surface to be processed during autonomous operations are not covered by the compression apparatus at all due to a position error of the compression apparatus. Thus, the overlap may cause several locations of the surface to be processed multiple times, however, check- ing and control requirements of the compression performance autonomously delivered by the compression apparatus is substantially reduced.

In order to secure quality of the respectively achieved compression result, it can be particularly advantageous when the compression apparatus independently determines at least one compression parameter of the ground automatically, wherein, the compression apparatus covers all spots of the surface to be processed where the compression parameter does not reach a predetermined threshold value at least one more time automatically. For example, it is conceivable that the compression apparatus is provided with a measuring device that is configured to determine ground rigidity during compression operations of the compression apparatus. The respectively determined ground rigidity can then be compared with a predetermined lower threshold value to a minimum ground rigidity that has to be reached so that the compression apparatus can detect independently whether the desired compression performance has already been reached or an additional compression of the ground is required. In the latter case, the compression device can cover, for example, all spots where the respective compression parameter does not correspond to the pre-set value by the position determination device and can then return to the respective spot and cover it again after a subsequent point and time, in particular, after completion of a first covering of all spots of the surface to be processed. This way, the surface to be processed can be compressed as desired without interference from a person operating the compression apparatus.

For a reliable statement regarding the presence of predetermined compression parameters it is useful to capture the compression parameters in predetermined intervals over the surface to be processed. For example, it is conceivable that determining a respective compression parameter is performed as a function of the movement of the compression apparatus, for example, every 50 centimeters or every ten seconds. Thus, advantageously, also other criteria are conceivable.

BRIEF DESCRIPTION OF THE DRAWINGS

The method according to the invention is subsequently described based on an embodiment with reference to drawing figures, wherein.

DETAILED DESCRIPTION OF THE INVENTION

Figure 1:
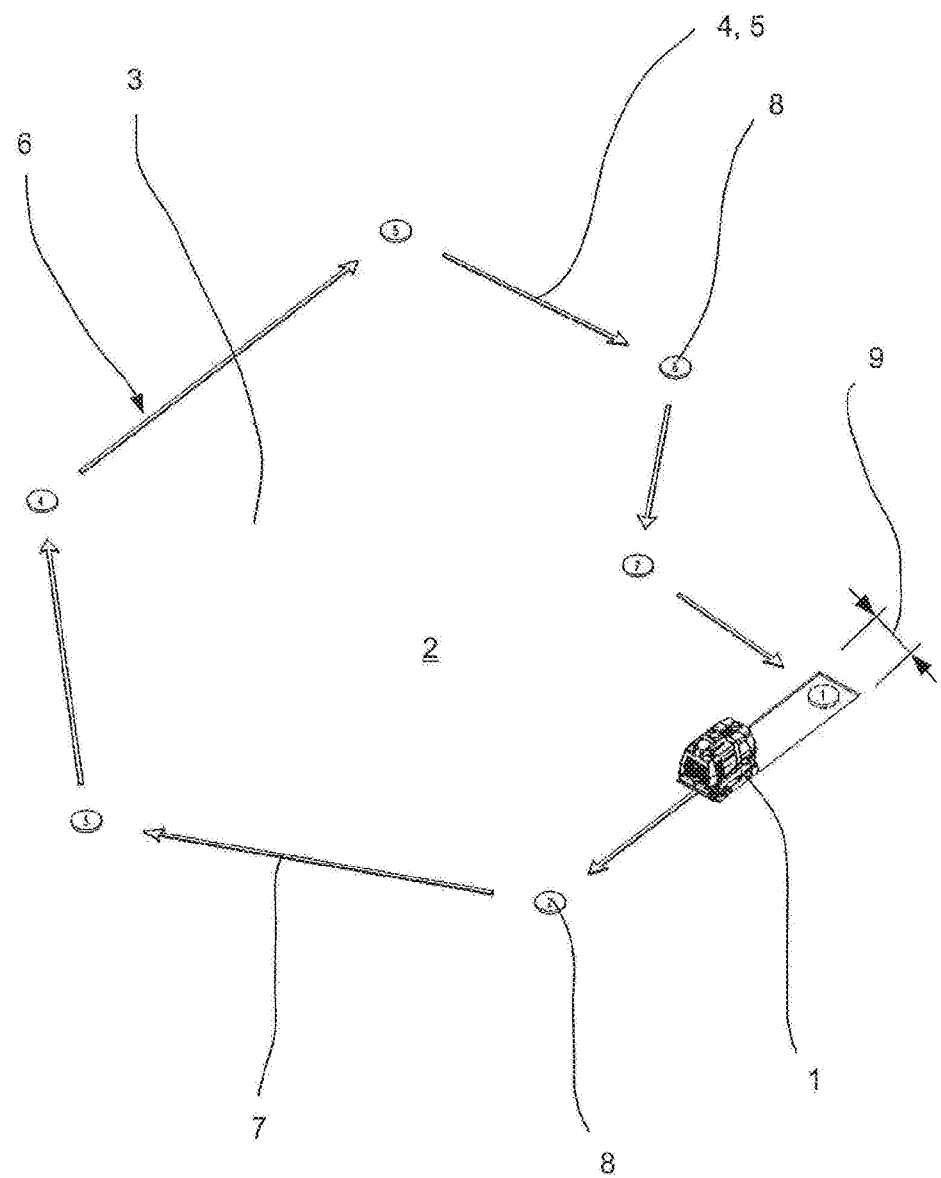
FIG. 1 illustrates a ground surface that is to be processed by the method according to the invention.
Figure 2:
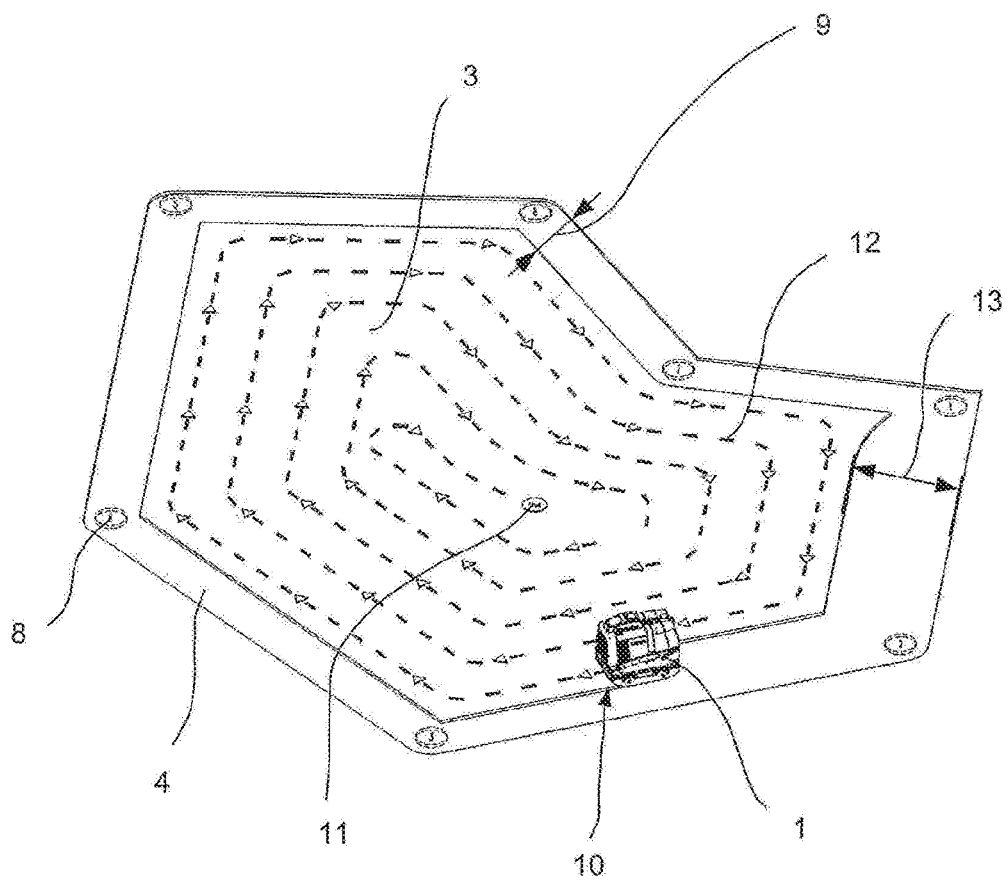
FIG. 2 illustrates a surface according to FIG. 1 during autonomous operations of the compression apparatus.

The instant embodiment illustrated in FIGS. 1 and 2 describes processing a surface 3 to be processed that is arranged on a ground 2. Compressing the ground 2 is performed by a compression apparatus 1. The compression apparatus 1 is a rattling plate which has an operating width 9 of approximately 90 cm. In the illustrated embodiment the compression apparatus 1 is remotely controllable by a corresponding operating device. Furthermore, the compression apparatus 1 is configured to process the surface 3 in autonomous operations.

In order to activate autonomous operations of the compression apparatus 1 it is initially required to perform preparations. In the instant embodiment, the preparations include initially defining the surface 3 to be processed by predetermining an outer boundary for of the surface 3 to be processed. This determination is performed in that a path 5 which shall subsequently form the outer boundary 4 is captured "manually". The term manually means in this context that the outer boundary 4 is captured with a cooperation of at least one person. An autonomous, this means automatic capturing of the outer boundary of the surface 3 to be processed is not possible with the compression apparatus 1 illustrated herein. However, this method step is conceivable as a matter of principle.

In order to determine the outer boundary 4 a non-illustrated position determination device is moved by a person along the path 5. The position determination device facilitates to determine a respective current position of the person. Thus, the position determination device includes at least one GPS module in the illustrated embodiment which enables the position determination device to determine a global position of a person carrying it in global coordinates.

While walking along the path 5, position data of the position determination device is continuously captured and stored.

In particular, characteristic points 8 along the path 5 are registered by the position determining device. This can be performed e.g. by manual triggering, in particular in that the person operating the position determination device triggers a discrete storing of a respective current position of the compression apparatus 1 by means of a manual input. Alternatively, or additionally, it is also conceivable that the position data captured by the position data determination device is captured in predetermined intervals at least once per second, so that a detailed image of the path 5 is obtained after walking along the entire path 5. In the illustrated embodiment, the described manual capture of the individual points 8 is used.

Walking along the path 5 is completed in the instant embodiment by closing the path 5. Put differently, a closed curve is created after walking along the path 5. This is evident in particular from FIGS. 1 and 2. After walking along the path 5 position data of the individual points of the path 5 is provided. From this position data an outer boundary 4 of the surface 3 that is to be processed can be determined or defined by a corresponding software application. Thus, individual points 8 of the path 5 are connected amongst each other by straight sections 7, wherein, each of the points 8 is only connected with a directly adjacent points 8. This method yields a polygonal path 6 which includes a plurality of straight sections 7 which extend between the individual points 8. This polygonal path 6 represents a virtual outer boundary 4 of the surface 3 that is to be processed.

Though processing the captured position data of the path 5 is only done after completing a capture of the path 5 it is conceivable that the virtual generation of the polygonal path 6 or of another random path is performed simultaneously with capturing the individual position data of points along the respective path. In particular it is also conceivable that individual points along a path are not connected with linear sections but with non-linear sections. As a matter of principle any shape of path is conceivable. It is also conceivable to manually manipulate the individual points that were captured by a position determination device along a respective path and thus to include points in the determination of the respective outer boundary which points where originally not determined by the position determination device. A manual manipulation of individual or plural points of a captured path is performed in any case using the respectively determined positions data.

After determining the outer boundary 4 of the surface 3 that is to be processed the corresponding electronic information regarding the position of the outer boundary 4 can be forwarded to the compression apparatus 1. The compression apparatus 1 is thus provided with information at which boundary or at which locations the surface 3 that is to be processed and compressed is limited or terminated. This enables the compression device 1 to process the surface 3 by autonomous operations. In particular a movement algorithm of the compression device 1 is configured so that it does not exceed or run over an outer boundary 4 of the surface 3 to be processed. As long as the compression device 1 is positioned within the outer boundary 4 autonomous operations of the compression device 1 can be activated and thereafter the compression device 1 can run along the surface 3 that is to be processed automatically.

Running over the surface 3 that is to be processed can be performed as a matter of principle in any way. In particular it is conceivable that the compression device 1 is provided with a random movement algorithm, which is known for example from vacuum cleaner robots or mowing robots. Movement algorithms of this type change a movement direction of the respective device for each collision of the device with a respective outer boundary of the surface to be processed. The change of the movement direction is random, wherein the respective surface to be processed is periodically covered at each of its spots on a statistic average.

For compressing a ground a movement algorithm of this type is conceivable as a matter of principle, however, it has significant disadvantages. In particular it can occur that individual spots of the surface 3 that is to be processed are covered significantly more often than other spots and therefore excessive compression can occur. Furthermore, a duration of the entire processing of the respective surface using a random movement algorithm is significantly increased which means a significantly higher consumption of fuels and a significantly higher wear of components of the compression apparatus 1 during operations of the compression apparatus 1. Therefore the goal is to process the surface 1 of the ground 2 that is to be compressed in a manner that is as effective and fast as possible.

Thus, a movement algorithm is proposed in the illustrated embodiment wherein the movement algorithm performs a covering of the surface 3 that is to be processed in a uniform manner. In particular, the surface 3 that is to be processed is processed in an annular manner by the compression apparatus 1, namely from an outside in. This is evident in particular from the illustration according to FIG. 2. The associated movement algorithm controls the compression apparatus during its autonomous operations so that it orients itself according to a respective preceding operating path. The first operating path which extends along the outer boundary 4 moves the compression apparatus 1 by orienting it along the outer boundary 4. In the illustrated embodiment the outer boundary 4 is already defined by running over it with the compression apparatus 1. This is particularly advantageous for a success of the method according to the invention but not mandatory. In particular it is a viable alternative to capture the outer boundary 4 for example by walking it with a position determination device in hand.

Covering the individual operating paths of the compression apparatus 1 is performed in the illustrated embodiment by using an overlap dimension 10. This overlap dimension 10 has a width of 40 cm by which each subsequent operating path overlaps with a respective preceding operating path. The consequence of this overlap is that a width 13 of two operating paths is less than a sum of two operating widths 9 of the compression apparatus 1. Providing an overlap dimension 10 is among other things due to the fact that current position determination devices have an inherent measuring error that is not negligible. Even when using a complex position determination device the measuring error is typically in a range of 30 cm to 50 cm. Considering an overlap dimension 10 therefore helps to avoid an accidental omission of individual spots of the surface 3 to be processed during autonomous operations of the compression apparatus 1.

During autonomous operations the compression apparatus 1 now systematically travels over the surface 3 in an annular manner from the outside in along operating paths 12 until the compression apparatus eventually reaches its terminal point 11. As soon as the compression apparatus reaches the terminal point 11 the compression apparatus 1 reports complete processing of the surface to be processed to the responsible person. An interference by the operator of the compression apparatus 1 is only necessary at this point in time.

Advantageously the compression apparatus 1 is configured with at least one measuring device which facilitates capturing ground parameters of the ground that is to be processed, in particular to capture the ground parameters autonomically during autonomous operations. For example, a measuring device of this type can be configured to capture ground rigidity of a ground 2 that is to be processed at a respective measuring location. The movement algorithm of the compression apparatus 1 in this embodiment is advantageously configured so that the compression apparatus 1 automatically performs a comparison of a respectively captured measuring value of the ground 2 to be processed with a predetermined threshold value and so that the compression apparatus can cover the respective spot several times as a function of the comparison. This provides the option to orient autonomous operations of the compression apparatus 1 not only towards a complete covering of all locations of the surface 3 that is to be processed but to orient it even as a function of the operating result. This has the significant advantage that a report by the compression apparatus 1 that the surface to be processed is actually processed completely inspires confidence that the surface to be processed was compressed with sufficient quality.

It is appreciated that the features described supra of the method according to the invention can be implemented as a matter of principle independently from each other as deemed technically appropriate by a person skilled in the art. The individual features of the method according to the invention are thus not limited to the combinations recited in a context with the instant embodiment.

REFERENCE NUMERALS AND DESIGNATIONS

1 Compression apparatus
2 Ground
3 Surface to be processed
4 Outer boundary
5 Path
6 Polygonal path
7 Straight section
8 Point
9 Operating width
10 Overlap dimension
11 End point
12 Operating path
13 Width

What is claimed is:

1. A method for autonomous operation of a compression apparatus for compressing a ground, the method comprising the steps:

choosing a surface to be processed of the ground;

preparing the compression apparatus or at least a portion of the surface to be processed so that the compression apparatus automatically processes the surface to be processed in an autonomous operation so that substantially each spot of the surface to be processed is processed at least once;

moving a position-determination device along a path which represents at least a portion of an outer boundary of the surface to be processed and capturing position data by the position determination device at least in an intermittent manner while moving the position determination device along the path;

generating electronic information regarding a position of the outer boundary of the surface to be processed based on captured position data of the path;

providing the compression apparatus with the electronic information to enable the compression apparatus during autonomous operation to automatically adjust a driving direction of the compression apparatus after colliding with the outer boundary so that the compression apparatus substantially remains within the surface to be processed; and a person walking the position determination device along the path, wherein the compression apparatus automatically captures at least one compression parameter of the ground during autonomous operations, wherein the compression apparatus automatically runs over each spot of the surface to be processed a second time in which spot the compression parameter does not reach a predetermined threshold value, or wherein the compression apparatus automatically runs over each spot of the surface to be processed so many times until the compression parameter has reached the threshold value at all spots of the surface to be processed.

* * * * *